Dec. 29, 1931.  H. CHRETIEN  1,838,173
PROCESS FOR OBTAINING HIGHLY LUMINOUS PHOTOGRAPHS
Filed Jan. 9, 1928
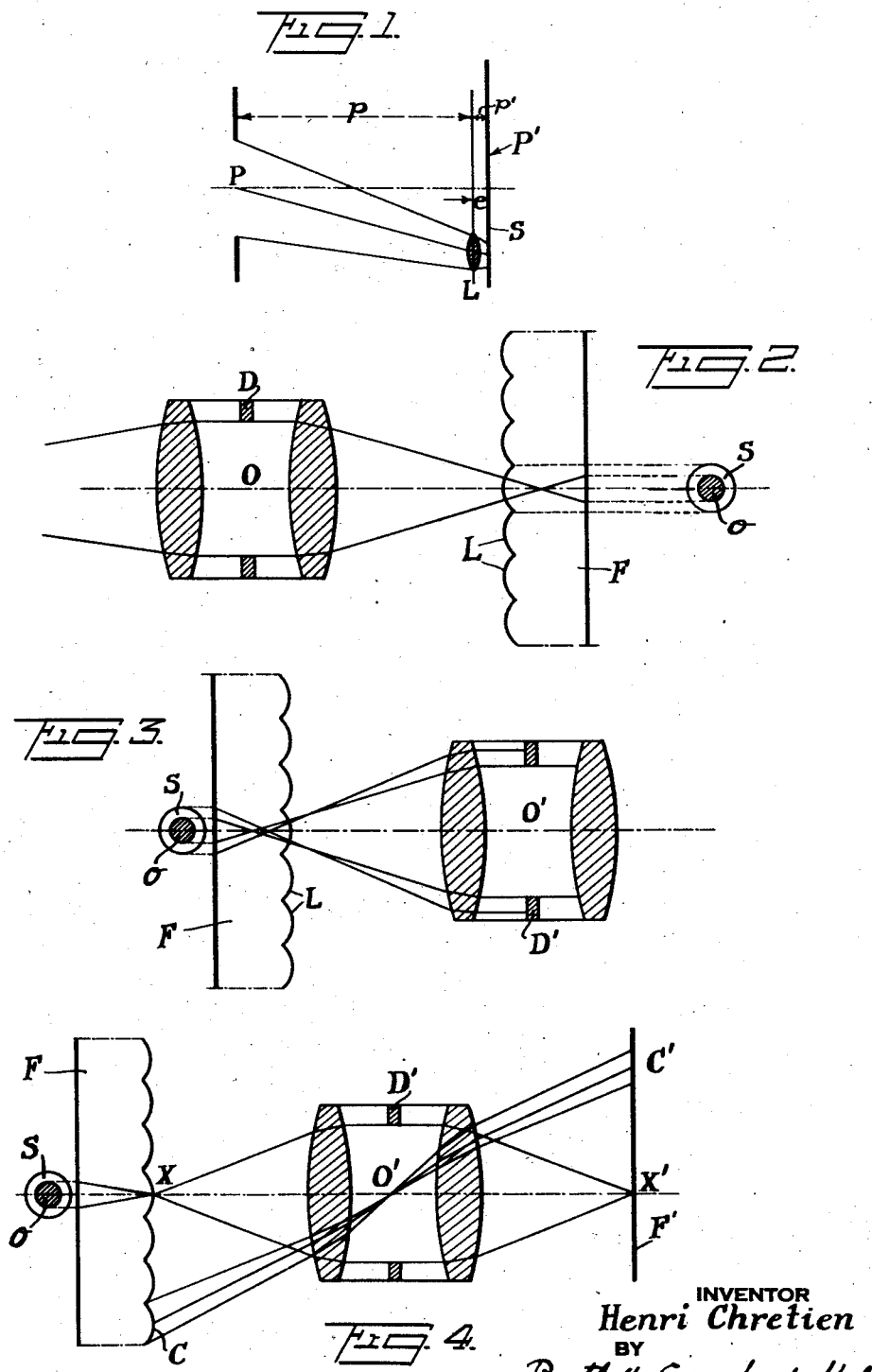
INVENTOR
Henri Chretien
BY
Bartlett, Eyre, Scott & Keel
ATTORNEYS Patented Dec. 29, 1931

1,838,173

UNITED STATES PATENT OFFICE

HENRI CHRETIEN, OF ST.-CLOUD, FRANCE, ASSIGNOR TO SOCIETE ANONYME FRANCAISE DITE: SOCIETE TECHNIQUE D'OPTIQUE ET DE PHOTOGRAPHIE (S. T. O. P.), OF ST.-OUEN, FRANCE

PROCESS FOR OBTAINING HIGHLY LUMINOUS PHOTOGRAPHS

Application filed January 9, 1928, Serial No. 245,556, and in France January 22, 1927.

The steadily increasing need of a greater luminosity for photographic processes is pursued simultaneously in two entirely distinct directions:

(a) By increasing the luminosity of the photographing objectives;

(b) By increasing the sensitiveness of the photographic emulsions themselves.

Considerable progress has been made in these two directions.

From a chemical point of view nothing has so far been perceived which limits the progress to be effected, and it is to be hoped that some day emulsions of a sensitiveness incomparably greater than that of the present emulsions will be prepared. But this day may not arrive for a long time.

From the optical side, on the contrary, the practical limit has been reached and in a number of cases it has been even exceeded because the increase of the luminosity of the photographic objectives is only obtained at the expense of their angular field and particularly of their tolerance of focussing. For applications to cinematography, for example, very luminous objectives, open to 1/2.5 and even to 1/2 are very desirable and in fact, such objectives, well corrected for aberrations have already been built. They are however useless in practice because their depth of focus is not sufficient and this is an irreducible difficulty as it is a question of pure geometry.

The process which forms the subject of the present invention, although purely optical and consequently leaving integrally free the field of subsequent improvements of a chemical nature, nevertheless permits of departing from this dilemma.

Of the accompanying drawings—

Fig. 1 is illustrative of the theory of the invention;

Fig. 2 illustrates diagrammatically the step in the process by which the negative is obtained; and Figs. 3 and 4 illustrate diagrammatically the step in the process by which the positive is printed from the negative.

Principle: Assuming (Figure 1), P to be the emergent pupil of the photographic objective (that is to say the image of the diaphragm as it is observed in the image-space), and S the surface of the sensitized layer.

A small lens L of very short focus is placed before this layer and the positions are so adjusted that the lens L is in the plane of the image produced by the objective and that the sensitized layer is located itself in the plane P', conjugated with P.

It will then be seen that all the light which forms the image at L and which falls on the area of this lens, of extent $s$, is now concentrated on the sensitized layer, within the area $\sigma$, which may be notably smaller so that neglecting the loss of light by reflection and absorption by the condensing lens L, the luminosity of the photographing objective is multiplied by the factor $$(1) \quad \lambda_o = \frac{s}{\sigma}$$

If $d$ equals the diameter of the lens L:

$$(2) \quad s = \pi \frac{d^2}{4}$$

If, now, D measures the diameter of the emergent pupil P and $\delta$ that of its image there will be obtained:

$$(3) \quad \delta = \frac{p'}{p} D$$

setting out $PL = p$; $LS = p'$; from which $$(4) \quad \sigma = \pi \frac{D^2}{4} \left(\frac{p'}{p}\right)^2$$

and $$(5) \quad \lambda_o = \left(\frac{d/p'}{D/p}\right)^2 = \left(\frac{\omega}{\Omega}\right)^2$$

in denoting by $$(6) \quad \omega = d/p'$$

the relative opening of the lens L and by $$(7) \quad \Omega = D/p$$

that of the photographing objective.

But, the luminosity of the photographic objective is measured by the square of its operative opening. The luminosity of the system constituted by the objective and the condensing lens L will therefore be:

$$(8) \quad \lambda_o \Omega^2 = \omega^2$$

that is to say equal to the luminosity peculiar to the lens L and this independently of the opening of the photographing objective.

Practical application. After what has been set out the portion of the image of the object which is formed in L is replaced by a uniform spot formed at S, of which the luminosity is $\lambda$ times greater than the average luminosity of the image.

In order that the principle invoked will be capable of receiving practical application the diameter $d$ of the lens L must therefore be of the order of size of the power of linear definition required in the final image. This leads to microscopic lenses. If one succeeds in obtaining them it suffices to dispose them in a manner well joined in a layer covering the whole extent of the image.

This result is obtained in a practical manner by moulding one of the faces of the support of the sensitized layer in form of spherical calottes of a radius $r$ such that the focal plane of this calotte comes very nearly into coincidence with the other face, which remains plane, and on which the emulsion is applied.

If $e$ indicates the thickness of the support it is necessary to arrive as close as possible to following ratio:

$$(9) \quad r = \frac{n-1}{n} e$$

$n$ indicating the index of refraction of the support as the distance $p$ will always be considerable relatively to $e$.

The distance indicated by $p'$ is therefore equal to $e/n$.

$$(10) \quad p' = e/n$$

In order to be well joined together, the spherical calottes should be limited by a polygonal contour which projects orthogonally on the plane face as regular hexagons.

The apparent grain of the image will have a dimension included between the diameter of circumscribed circles and the diameter of circles inscribed at and in these hexagons, and in practice there may be adopted for the measurement of the grain of the image the diameter of the circle of the same surface. It is this diameter which plays the part of $d$ in the preceding formulæ.

The formula (6) thus becomes:

$$(11) \quad \omega = n \frac{d}{e}$$

The luminosity $\omega^2$ will thus be in the inverse ratio to the square of the power of resolution $1/d$ and of the thickness of the support.

Assuming $N_1$ to be the number of condensing lenses L per unit of surface; there will be obtained:

$$(12) \quad N_1 = \frac{1}{s} = \frac{4}{\pi d^2}$$

which gives:

$$(13) \quad \omega = \frac{2n}{\sqrt{\pi} \, e \sqrt{N_1}} = 1 \Big/ \frac{\sqrt{\pi} \, e}{2n} \sqrt{N_1}$$

$$(14) \quad d = \frac{2}{\sqrt{\pi} \sqrt{N_1}}$$

If, for example, a celluloid cinematographic film has the usual thickness: $e = 0.135$ mm. and assuming for the refractive index the rough value: $n = 3/2$.

The radius of curvature $r$ of the spherical calottes to be moulded on the free surface of the support will be: $r = 0.090$ mm.

Taking into consideration gofferings having respectively: $N_1 = 300, 400, 500$ lenses per square millimeter.

There will be obtained:

$$d = 1.128 / \sqrt{N_1}$$

or: $d = 1/15.4, 1/17.8, 1/20$ mm. respectively $$\omega = \frac{1}{0.08 \sqrt{N_1}}$$

or: $\omega = 1/1.4, 1/1.6, 1/1.8$ respectively.

When comparing the luminosity obtained by the use of this film with an objective open to $\Omega = 1/6.3$, with that obtained by the use of an ordinary film with the same photographic objective, the photographic emulsions being the same in both cases, there will be obtained: $(6.3)^2/\omega^2 = 20, 15.6, 11$, respectively.

It will be seen that a film of standard thickness, capable of a definition above 1/15 of a millimeter, will have a luminosity twenty times greater by the application of the means specified.

Strictly speaking, it is necessary to consider the loss of light caused by the introduction of a supplementary optical system, which loss is less than 10%, and by the fact that the small lenses are not exactly joined. A loss of 15% may be expected for the junctures. Finally the image of the diaphragm is not free from aberration and on the other hand the photographic image diffuses slightly in the region which is exterior thereto. But it will be seen that these latter defects are practically without influence and that it is possible to fix at a maximum of 5% the loss of light which results. All calculations made —and experience entirely confirms this estimate—the factor $\lambda_o$ should be multiplied by 0.75 for furnishing the practical factor of luminosity. For the preceding example this gives: $\lambda = 16$ times.

A negative print having been obtained by this process, what will it show?

If it is examined by the eye in the manner of an ordinary negative it will have substantially the same appearance.

In fact the image is well composed of small black circular spots, much more opaque than the corresponding region of a negative taken in the ordinary manner, but each spot is surrounded by a white portion, and, as with the naked eye it is not possible to discriminate the detail of the structure, the whole appears grey and substantially of the same grey as in the case of an ordinary negative.

The positive picture or image that would be obtained by virtue of simple contact on the negative as just described would also be of the same uniform grey tint or hue as that of the said negative and that of an ordinary positive obtained by a normal positive.

Therefore, instead of reproducing the negative by simple contact, the procedure is effected by way of reproduction in the photographic camera by placing the new negative with the gelatine at the rear and by adjusting the diaphragm of the objective of this camera in position and in diameter so as to cause it to coincide with the unique image which the small lenses restore from the diaphragm of the photographic objective. By this arrangement the white field which surrounds each image will be completely blocked out by the contour of the diaphragm and the differences in density shown on the positive by the different regions of the object will be substantially equivalent to those which would be obtained with an objective with a luminosity $\lambda$ times larger than that of the objective actually used.

The same advantage is obtained by reducing the diameter of the diaphragm for reproduction a little below the preceding theoretical diameter so as to use only the central region of the small spots, which is more opaque than the peripheral region by reason of the aberrations of the lens system and the lateral photographic diffusion of the image.

In producing the negative the diaphragm D (see Fig. 2) of the objective O is so chosen relative to the minute lenses L of the embossed film F as to cause each image of the section of the diaphragm to cover an area $\sigma$ which is but a fraction of the area S covered by each lens L. After exposure of the film F, the positive film F' is then printed therefrom; the embossed surface of the negative film being faced toward the positive film F' (Figs. 3 and 4). The objective O' is so placed that only the rays coming from the exposed areas S are permitted to pass therethrough, the rays coming from the outer annular unexposed portions of areas S being cut off by diaphragm D' as shown in Fig. 3. In Fig. 4 the rays forming the image X' of the point X and the image C' of the calotte C are indicated diagrammatically.

Having now particularly described and ascertained the nature of my said invention and in what manner the same is to be performed, I declare that what I claim is:—

1. In monochrome photography the method of obtaining a photographic negative which consists in exposing in a camera a film which is goffered or covered with elementary or small spherical refractive lenses, with the images of the diaphragm aperture of the photographic objective produced by said lenses coinciding with the plane of the sensitized layer, only a small central portion of the sensitized layer defined by each of the said lenses being strongly illuminated by a monochrome image formed by rays from the whole area of the aperture of the objective.

2. The method of obtaining a positive on an ordinary film from a negative obtained according to the method of claim 1 which consists in exposing the film in a reproducing apparatus with the position and diameter of the diaphragm of the objective adjusted so as to correspond to an opening which is smaller than that of the objective by means of which the negative has been obtained.

3. In monochrome photography the method which consists in first obtaining a photographic negative by exposing in a camera a film which is goffered or covered with spherical refractive elementary lenses, with the images of the diaphragm aperture of the objective produced by the elementary lenses coinciding with the plane of the sensitized layer, only a small central portion of the sensitized layer covered by each of the elementary lenses being strongly illuminated by a monochrome image formed by rays from the whole area of the aperture of the objective, and then obtaining a positive on an ordinary film by exposing the film in a reproducing apparatus with the diaphragm of the objective adjusted as to position and diameter to correspond to an opening which is smaller than that of the objective by means of which the negative has been obtained.

In testimony whereof I have signed my name to this specification.

HENRI CHRETIEN.